(12) United States Patent
Karst

(10) Patent No.: US 7,375,314 B2
(45) Date of Patent: May 20, 2008

(54) SELF-CLEANING OPTICAL SENSOR

(75) Inventor: Dieter Karst, Stein am Rhein (CH)

(73) Assignee: Kistler Holding AG, Winterthur (CH)

( * ) Notice: Subject to any disclaimer, the term of this patent is extended or adjusted under 35 U.S.C. 154(b) by 28 days.

(21) Appl. No.: 10/548,167

(22) PCT Filed: Mar. 11, 2004

(86) PCT No.: PCT/CH2004/000142

§ 371 (c)(1),
(2), (4) Date: Jul. 12, 2006

(87) PCT Pub. No.: WO2004/081511

PCT Pub. Date: Sep. 23, 2004

(65) Prior Publication Data

US 2007/0068495 A1     Mar. 29, 2007

(30) Foreign Application Priority Data

Mar. 13, 2003  (CH) .................................. 0416/03

(51) Int. Cl.
G01L 23/16 (2006.01)
G01L 23/22 (2006.01)
G01M 15/00 (2006.01)
(52) U.S. Cl. .................. 250/227.11; 250/554
(58) Field of Classification Search ........... 250/227.11, 250/554; 123/494
See application file for complete search history.

(56) References Cited

U.S. PATENT DOCUMENTS

| 4,358,952 A | * | 11/1982 | Maurer et al. ............. 73/35.07 |
| 4,397,283 A |   | 8/1983  | Komaroff et al. |
| 4,409,815 A |   | 10/1983 | Burkel et al. |
| 4,419,212 A |   | 12/1983 | Dietz et al. |
| 4,521,088 A | * | 6/1985  | Masom ....................... 359/507 |
| 4,572,119 A |   | 2/1986  | Ikeda |
| 6,320,184 B1 |  | 11/2001 | Winklhofer et al. |
| 7,007,547 B2 | * | 3/2006 | Philipp et al. ................ 73/116 |
| 2002/0134138 A1 | | 9/2002 | Philipp et al. |

OTHER PUBLICATIONS

PCT International Search Report, PCT/CH2004/000142, May 25, 2004.
Patent Abstracts of Japan, vol. 009, No. 141 (P-364), Jun. 15, 1985, JP 60 022116 A.

* cited by examiner

*Primary Examiner*—John R Lee
(74) *Attorney, Agent, or Firm*—Dority & Manning, P.A.

(57) ABSTRACT

The invention relates to an optical sensor for detecting light emission in combustion processes in a combustion chamber. At least one lens of the sensor faces the combustion chamber and is disposed on the tip of the sensor. The inventive sensor is provided with a heating device, which is disposed on the tip thereof, in the region of the front lens. The heating device can be a wire coil, a laser or a conduit with heated fluid. The sensor can include a controller for controlling the temperature of the heating device so that the tip of the sensor can be heated by the heating device to a specific temperature at which any soot on the front lens is combusted. As a result, the sensor remains clean and operational during the entire measuring period as desired.

14 Claims, 1 Drawing Sheet

SELF-CLEANING OPTICAL SENSOR

CROSS-REFERENCE TO RELATED APPLICATIONS

This application claims priority from previously filed PCT application No. PCT/CH2004/000142 filed on Mar. 11, 2004, which claims priority from CH 416/03, filed Mar. 13, 2003.

STATEMENT REGARDING FEDERALLY SPONSORED RESEARCH OR DEVELOPMENT

N/A

BACKGROUND OF THE INVENTION

The invention relates to an optical sensor for detecting the light intensity of combustion processes in a combustion chamber.

In combustion engines, for example in spark ignition engines or diesel engines, optical sensors are used to monitor the combustion. The temporal recording of the light intensity in a combustion chamber provides important data as boundary conditions for computer models, since one might use the light intensity to derive the temperature. The detection of the light intensity also correlates to the soot concentration in the combustion chamber. Because regulations of engine exhaust are becoming more and more restrictive, much effort is devoted to decrease soot formation during combustion in engines. Optical sensors provide valuable data for these developments.

Of specific interest are optical sensors exhibiting a detection angle of up to 130° and having such a small diameter that they might be installed in a sparkplug or a glow plug.

Test experiments revealed, that the side of the optical sensor facing the combustion chamber will be covered with soot after a certain period of time, in most cases after a few minutes. Thereby, the transparency of the front lens is reduced. After the soiling of said lens, the values measured by the optical sensor can be correlated to the light intensity in the combustion chamber only after a laborious computed calibration. For this purpose the sensor must be dismounted and cleaned after the calibration. This process disrupts the measurement, is very time consuming and expensive.

Experiences have shown that the soot may be burnt off and the front lens may be purified, when the temperature at said lens is at least 400° C. For this purpose in some applications, the front tip of the sensor is selectively exposed to the hot gas of the combustion chamber. Thereby, the soot is eventually burnt off again, depending on the temperature in the combustion chamber, and the measurement provides useful data again. In most cases this gas flow is unfortunately not sufficient to burn the front lens clean.

OBJECTS AND SUMMARY OF THE INVENTION

The object of the present invention is to provide an optical sensor for the detection of combustion processes in a combustion chamber, which is not affected by the soot deposition at the side facing the combustion chamber.

The object is solved by the features of the first claim.

DETAILED DESCRIPTION OF THE PREFERRED EMBODIMENTS

Figure 1:
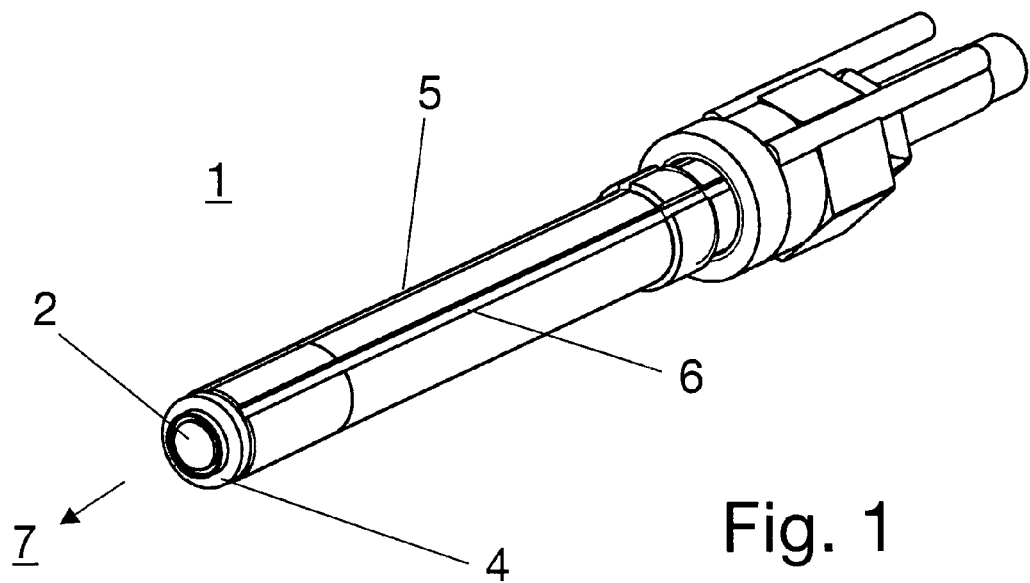
FIG. 1 is an embodiment of an optical sensor according to the present invention.

FIG. 1 shows an optical sensor indicated generally by the numeral 1. This sensor is configured with one or more lenses 2 disposed at the side facing the combustion chamber, which is generally designated by the numeral 7. The light coming in through the lenses 2 is transmitted by an optical fiber (designated 3 in FIG. 2) in the center of the sensor 1 and subsequently processed for analysis.

In the course of a measurement, the front surface of lens 2 of sensor 1 will be soiled by soot from the combustion chamber 7. This embodiment of the present invention has a heating mechanism 4 at the tip of the sensor 1 in the region of the front lens 2. The invention resides in that the sensor tip may be heated by said heating mechanism 4 to a temperature that ensures that the soot at the front lens 2 is burnt away. Thereby the sensor 1 may be kept clean and operational during the entire desired measurement period.

In this embodiment the heating mechanism 4 consists of a heating coil. A temperature sensing element 6 mounted at sensor 1 functions as a temperature control for the heating coil 4.

Figure 2:
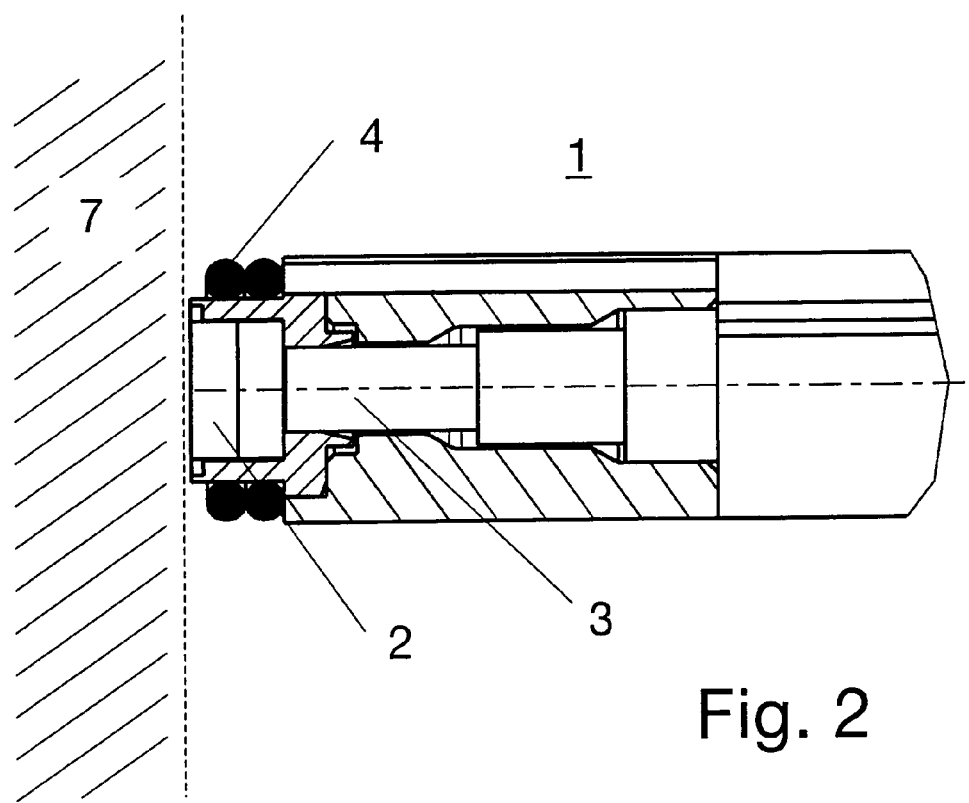
FIG. 2 is a detailed view of a sensor tip of an optical sensor according to the present invention.

FIG. 2 shows the tip of an embodiment of the present invention of an optical sensor 1 having lenses 2 and the adjacent optical fiber 3. The invention described herein may be employed with other sensors as well; and accordingly this FIG. 2 is not intended to have any limiting effect on the scope of the present invention. In the embodiment of FIG. 2 the heating wire 4 has been wound several times around the lenses 2. Preferable are windings between 1 to 8 coils, and in particular 2 to 4 coils are desirable. A heating wire 4 with a cross section of between 0.25 and 1 mm will be preferably used. The powers with which the heating wire 4 is heated is preferably between 10 and 70 Watts, and in particular between 15 and 40 Watts is desirable.

Before the sensor 1 takes a measurement, the heating mechanism 4 is brought to the desired temperature that is required to keep the surface of the front lens 2 clean. The temperature required for that purpose is about 400° C., preferably about 600° C. at the sensor tip. Soot which would be deposited on the surface of the front lens 2 will be immediately burnt at these temperatures. During the entire measurement the heating system provides for a clean lens 2 and thus in this regard for reliable measurements.

Alternatively, the required heating may also be carried out by means of the supply of energy in the form of electromagnetic waves. Said energy may be generated by a laser for example. Thereby, the laser light may be directed via optical fiber 3 onto the lens. Deposits on the lens 2 absorb the impinging laser light energy and will be burnt thereby. A difference of this arrangement is indeed that the heating of the lens 2 to remove the soot may not be performed while the sensor is taking a measurement. Thus the measurement by the sensor must be stopped after each new soiling of the lens, and a cleaning has to be done before the sensor resumes taking measurements.

Adjacent to the lenses, conduits or channels 5 may alternatively be provided, and such conduits or channels may be filled with a fluid. Said fluid will be heated in a suitable manner to the desired temperature and brought to the sensor tips in conduits or channels intended therefor. The transfer of heat in this region of the sensor tip provides for the combustion of soot on the front lenses.

The advantage of a heating of the sensor tip is that the measurement may be carried out at any operation site, regardless of the degree of soiling, particularly in the combustion of a diesel engine. A further advantage is that no laborious calibration has to be done and that the sensor need not be withdrawn from the combustion site in order to be cleaned and recalibrated.

The invention claimed is:

1. An optical sensor for the detection of combustion processes in a combustion chamber, comprising: a sensor body elongating in an axial direction and having at one end thereof a sensor tip, at least one lens disposed at the sensor tip and configured for facing the combustion chamber, and a heating device carried on the sensor body and configured for heating the at least one lens at the sensor tip such that the at least one lens is kept clear of soot from the combustion chamber.

2. An optical sensor for the detection of combustion processes in a combustion chamber, comprising:
   a sensor body elongating in an axial direction and having at one end thereof a sensor tip:
   at least one lens disposed at the sensor tip and configured for facing the combustion chamber; and
   a heating device carried on the sensor body and configured for heating the at least one lens at the sensor tip such that the at least one lens is kent clear of soot from the combustion chamber;
   wherein the heating device includes a conduit configured to carry a heated fluid to the sensor tip at which the at least one lens is disposed.

3. An optical sensor as in claim 1, wherein the heating device is configured to generate heat in the form of electromagnetic waves directed at the at least one lens.

4. An optical sensor as in claim 1, wherein the heating device is configured to be controlled to provide the heat needed to keep the at least one lens clear of soot from the combustion chamber.

5. An optical sensor as in claim 1, further comprising:
   an optical fiber disposed in said sensor body and having one end disposed in optical alignment to receive electromagnetic radiation passing through said at least one lens.

6. An optical sensor for the detection of combustion processes in a combustion chamber, comprising:
   a sensor body elongating in an axial direction and having at one end thereof a sensor tip;
   at least one lens disposed at the sensor tip and configured for facing the combustion chamber; a heating device carried on the sensor body and configured for heating the at least one lens at the sensor tip such that the at least one lens is kent clear of soot from the combustion chamber; and
   an optical fiber disposed in said sensor body and having one end disposed in optical alignment to receive electromagnetic radiation passing through said at least one lens;
   wherein the heating device includes a laser carried by the sensor body and configured and disposed to generate electromagnetic waves directed through the optical fiber and directed at the at least one lens.

7. An optical sensor as in claim 1, wherein the heating device is configured to heat the sensor tip to at least 400° C.

8. An optical sensor as in claim 7, wherein the heating device is configured to heat the sensor tip to at least 600° C.

9. An optical sensor as in claim 1, wherein the heating device is configured as a heating wire.

10. An optical sensor as in claim 9, wherein the heating wire has a diameter of 0.25 to 1 mm.

11. An optical sensor as in claim 10, wherein the heating wire is configured to be operated with a heating power of 10 to 70 Watts.

12. An optical sensor as in claim 11, wherein the heating wire is configured to be operated with a heating power of 15 to 40 Watts.

13. An optical sensor for the detection of combustion processes in a combustion chamber, comprising:
   a sensor body elongating in an axial direction and having at one end thereof a sensor tip;
   at least one lens disposed at the sensor tip and configured for facing the combustion chamber; and
   a heating device carried on the sensor body and configured as a heating wire for heating the at least one lens at the sensor tip such that the at least one lens is kept clear of soot from the combustion chamber;
   wherein the at least one lens is disposed within the sensor tip and the heating wire is configured as at least one coil wrapped around the exterior of the portion of the sensor tip containing the at least one lens.

14. An optical sensor as in claim 13, wherein the heating wire is configured as a coil having 1 to 8 coils wrapped around the exterior of the portion of the sensor tip containing the at least one lens.

* * * * *